United States Patent

[11] 3,554,145

[72] Inventors Michael C. Hornung;
Everett J. Tasset, Spearville, Kans.
[21] Appl. No. 658,861
[22] Filed Aug. 7, 1967
[45] Patented Jan. 12, 1971
[73] Assignee American Products, Inc.
Spearville, Kans.

[54] SEED AND FERTILIZER-METERING APPARATUS
7 Claims, 9 Drawing Figs.
[52] U.S. Cl. .................................................... 111/77,
222/274
[51] Int. Cl. .................................................... A01c 7/18
[50] Field of Search ........................................ 111/77, 36,
78, 18, 52; 172/776; 222/271, 273, 274

[56] References Cited
UNITED STATES PATENTS

| 767,762 | 8/1904 | McClelland | 222/271UX |
| 924,377 | 6/1909 | Pierce | 222/271X |
| 2,430,741 | 11/1947 | Smith | 111/52 |
| 2,921,640 | 1/1960 | Roppel | 111/85X |
| 3,155,168 | 11/1964 | Telecky | 172/776X |
| 3,163,333 | 12/1964 | Lindaberry | 222/274X |
| 3,362,581 | 1/1968 | Cordes | 222/274X |
| 3,331,341 | 7/1967 | Hartwig | 111/73 |

Primary Examiner—Robert E. Pulfrey
Assistant Examiner—Ronald C. Harrington
Attorney—John H. Widdowson ABSTRACT: A feed- and fertilizer-metering apparatus is provided with a frame, ground wheels, and a hopper carried by and transversely extending the frame. The hopper is provided with a plurality of outlets at its bottom surface which communicates with a housing having a plurality of openings at a 135° angle with respect to the vertical plane of the hopper, a plurality of rotatable means having smooth peripheral faces and provided with acting faces in parallel-spaced relationship and arranged obliquely to the axes are positioned upon an axle extending the length of the hopper and passing through the plurality of housing units. The axle and thus the rotatable means are rotated thereby causing the desired amount of seed or fertilizer to enter the dispensing element.

INVENTORS
MICHAEL C. HORNUNG
EVERETT J. TASSET
BY
John H. Widdowson
Glen M. Burdick
ATTORNEYS

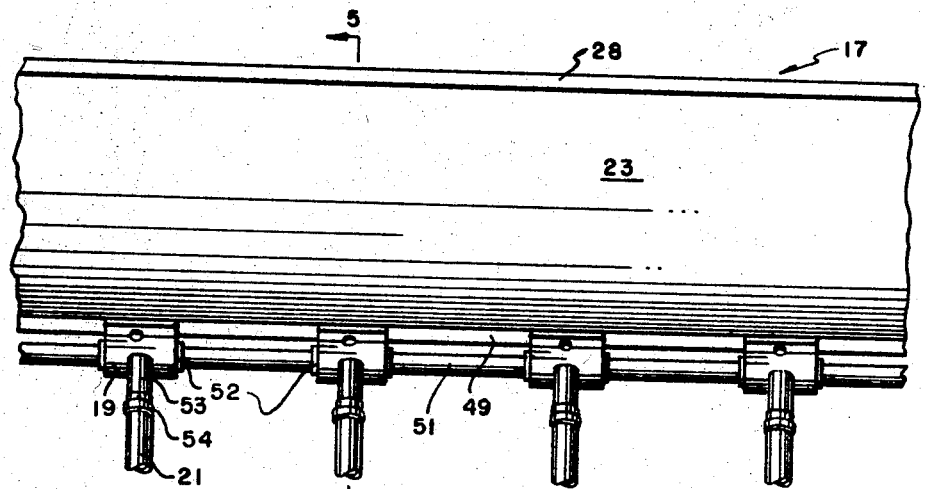
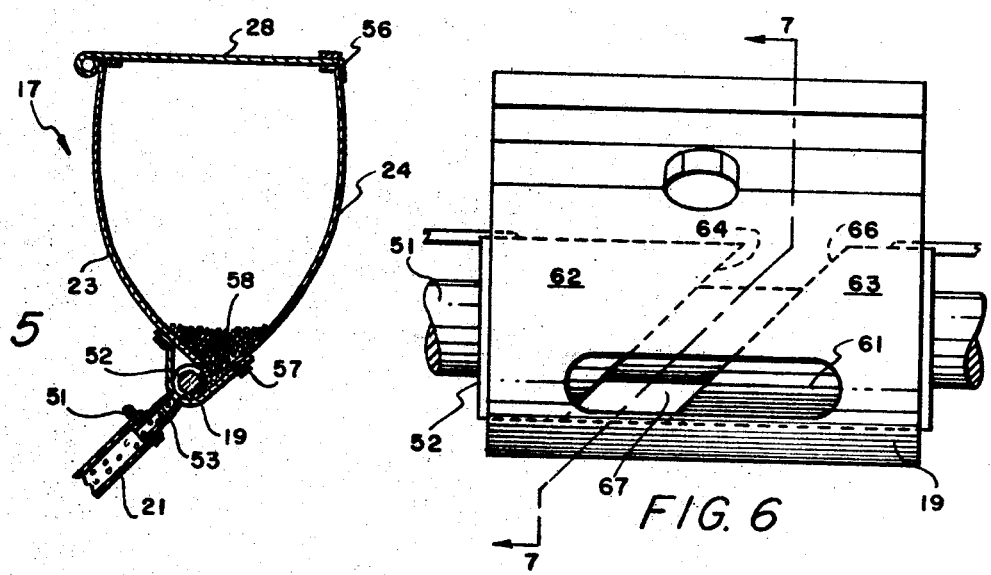
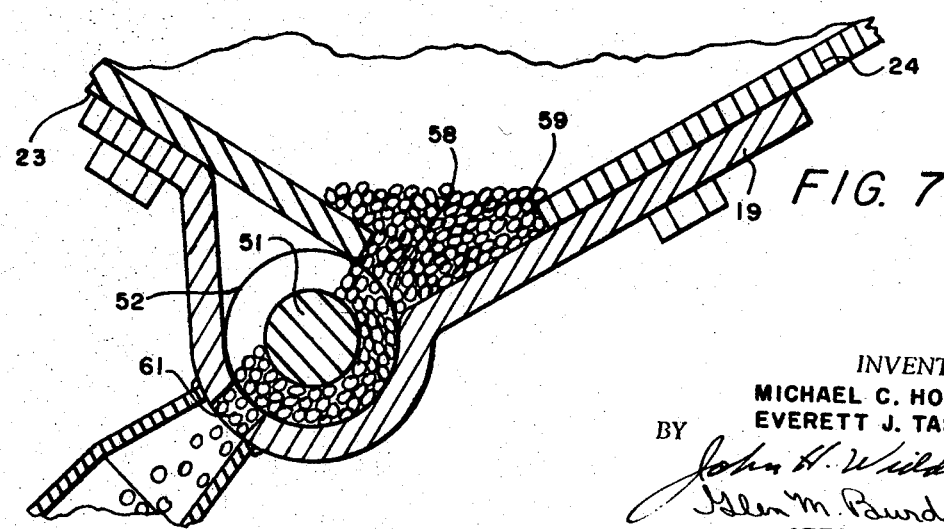

INVENTORS
MICHAEL C. HORNUNG
EVERETT J. TASSET
BY John H. Wildinson
Glen M. Burdick
ATTORNEYS 3,554,145

1

SEED AND FERTILIZER-METERING APPARATUS

This invention relates to an apparatus for dispensing seed, fertilizer, and the like. In one aspect, this invention relates to an apparatus for dispensing seed, fertilizer, and the like wherein the rate of discharge can be readily varied. In another aspect, this invention relates to an apparatus which prevents flow through of seed, fertilizer, and the like when the apparatus is stationary. In another aspect it relates to an apparatus which can be readily moved from location to location without the loss of seed, fertilizer and the like. In another aspect, this invention relates to an apparatus which prevents the bridging of coarse, bulky materials within the hopper thus insuring even dispensing of the material.

In the dispensing of seed and dry granular material, such as granular-type fertilizer, lime, gypsum, etc., a seed or fertilizer-dispensing device is operatively associated with a hopper to feed the seed or fertilizer therefrom at a predetermined rate into a dispensing tube which conveys the feed or fertilizer to a furrow in the soil. Various types of dispensing devices are known. However, problems have been incurred by the apparatus of the prior art providing an adequate apparatus which prevents undesirable waste of seed or fertilizer when the dispensing means is stationary or being moved to another location. Complex moving parts employed to prevent the dispensing of the feed or fertilizer, and thus their waste, often fail and thus cause a waste of costly seed and fertilizer or a delay seeding or fertilizing until the unit is repaired.

Further, it is desirable to adjust the feed mechanism of the dispensing apparatus easily and accurately so that the rate of dispensing of the seed or fertilizer can readily be controlled. Problems have occurred when dispensing certain coarse, bulky materials, such as oats, soya beans, and shelled corn, because the coarse, bulky materials tend to bridge over the outlets in the bottom of the hopper and thus a constant deliverance of the materials is not achieved thereby causing uneven planting and frequent shutdown of the dispensing means in order to insure proper dispensing of the materials.

An object of the present invention is to provide a seed- and fertilizer-metering apparatus which prevents undesirable dispensing of the materials while the apparatus is stationary or being moved to another location without employing complex moving parts.

Another object of this invention is to provide a seed- and fertilizer-metering apparatus wherein the rate of feed of the seed or fertilizer can be readily adjusted.

Another object of this invention is to provide a seed- and fertilizer-metering apparatus wherein the rate of feed of the dispensing device can be accurately obtained and does not vary.

Another object of this invention is to provide a seed- and fertilizer-metering apparatus which prevents coarse, bulky materials from bridging over the bottom openings of the hopper thereby providing a constant deliverance of the material to the dispensing means.

Various other objects, advantages, and features of the invention will become apparent to those skilled in the art from a study of the drawings, the written disclosure, and the appending claims.

According to the present invention, we have now found that a seed- and fertilizer-metering device having a hopper means with a plurality of outlets therein, a housing connected to said hopper means and communicating with the outlets of said hopper, said housing likewise having a plurality of outlets therein, said outlets of said housing being positioned beyond the vertical center of the outlet of said hopper means and a rotatable means positioned within said housing provides a constant feed rate of seed or fertilizer to a plurality of laterally aligned dispensing means which are in communication with the outlets of said housing.

Further according to the invention we have found that the outlets of said housing are preferably positioned at an angle of about 135° with respect to the outlet of said hopper means thereby controlling the flow of the seed or fertilizer so that when the apparatus is stationary or being transported from one location to another no seed or fertilizer is allowed to pass through the dispensing means via the outlet in the housing, the rotatable means, and the outlet in the hopper means thereby preventing waste and undesirable discharge of the seed or fertilizer within the hopper means.

Further according to the invention we have now found that by providing a shoulder within the bottom of the hopper means by joining the housing to the exterior of the hopper means prevents coarse, bulky materials, such as oats, soya beans, shelled corn and the like, from bridging in the hopper means and thus provides a constant, even distribution of the coarse, bulky material through the rotatable means assembly and thus through the dispensing means.

Further according to the invention we have found that a plurality of housing means having a plurality of rotatable means positioned therein wherein each of said rotatable means comprises two members having smooth peripheral faces and which are likewise provided with acting faces in parallel-spaced relationship and arranged obliquely to the axes when rotated by the rotation of an axle passing through each of said housing means and onto which each of said rotatable means is positioned, produces a constant feed rate of seed or fertilizer through the outlet of said hopper means, thereby causing said material to flow between the passage formed by said faces of said rotatable means positioned in parallel-spaced relationship and arranged obliquely axes and through the outlet of said housing positioned at a 135° angle with respect to the vertical plane of the outlet of said hopper means, thus into said dispensing means provides a constant even distribution of the seed or fertilizer through the dispensing means and thus to the furrow. Further, when axle and thus the members of said rotatable means are not rotated no material is allowed to pass from the hopper means thereby preventing waste of the seed and fertilizer when the unit is stationary or being transported from one location to the other.

Further according to the invention, we have found that by providing the outlet end of the flexible tubular conduit means employed as the dispensing member with a 30° angle the proper angle of dispersion of the seed and/or fertilizer into the furrow is attained.

Further according to the invention, we have found that by employing a plastic tubular conduit, having an opening and its lower end cut at a 30° angle and attached behind a furrow opener which, when followed by a press wheel, provides seed from the hopper at a desired angle of dispersion and the press wheel forces the seed into the ground thereby facilitating the germination of the seed.

In the drawings,

FIG. 4 is a partially broken view of the hopper of the apparatus FIGS. 1 and 2.

FIG. 5 is an end view of the hopper of FIG. 4 showing a sectional view of the housing and the rotatable means positioned therein.

FIG. 6 is a side view of the housing showing the rotatable means disposed therein.

FIG. 7 is a sectional view showing the housing attached to the hopper and having the rotatable means dispersed within said housing.

Figure 1:
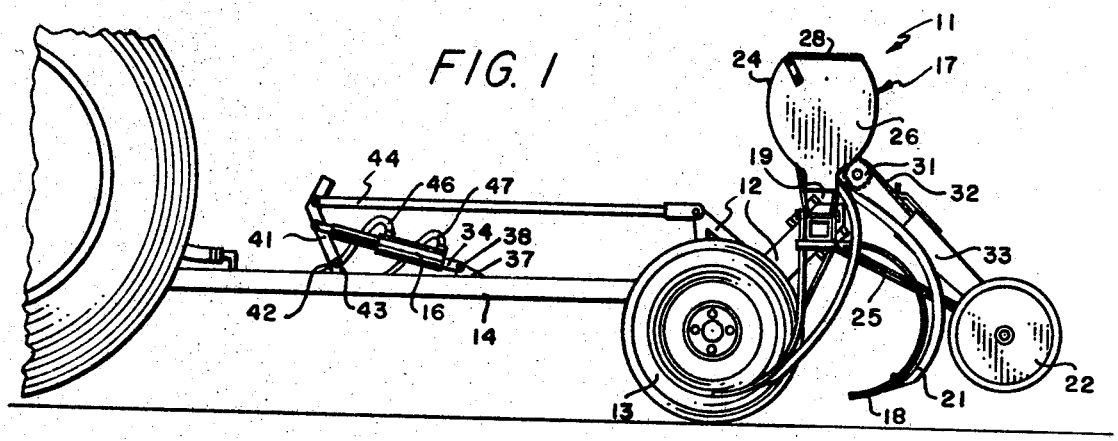
FIG. 1 is a side view of the seed- and fertilizer-metering apparatus in a raised position for transportation from location to location.
Figure 2:
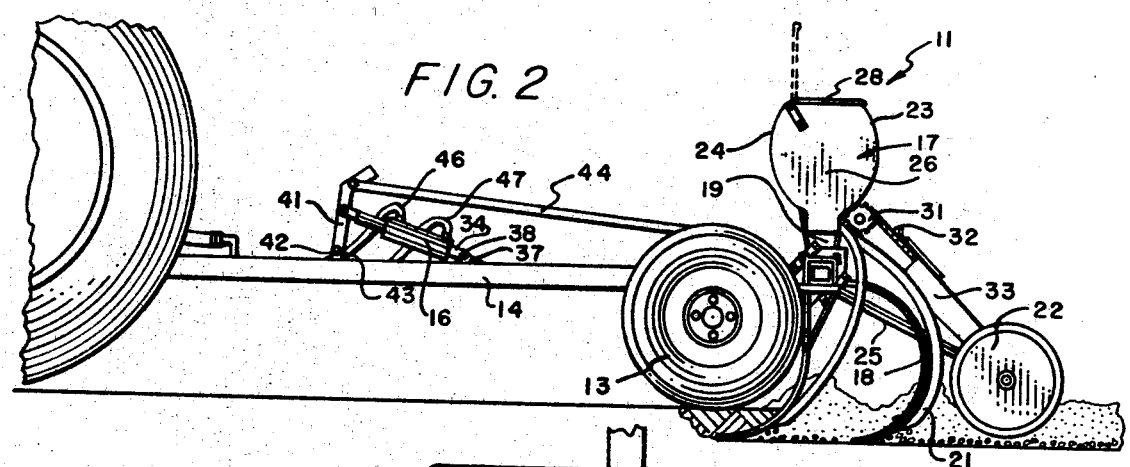
FIG. 2 is a side view of the apparatus of FIG. 1 in operation within a field.

Referring now to the drawings wherein like elements will be designated by like numerals, and particularly to FIGS. 1 and 2, a side view of the seed- and fertilizer-metering device of the present invention, generally indicated by numeral 11 is shown. Apparatus 11 comprises frame element 12, wheels 13, coupling member 14, hydraulic cylinder 16, hopper means 17, furrowing means 18, housing means 19, dispensing means 21 and press wheel 22. Frame 12 is carried by wheels 13 and hopper means 17 is carried by and traversely extends frame 12.

Hopper means 17 is provided with sidewalls 23 and 24, end members 26 and 27 and cover plate 28. Sidewalls 23 and 24 are downwardly converging thereby providing a long narrow opening in the bottom of the hopper means 17 and running the length of hopper means 17. The sidewalls 23 and 24 are preferably formed of sheet metal and bent to the desired shape. The end members, such as 26, are likewise formed of sheet metal and cut to the proper shape and then connected to sidewalls 23 and 24 by any suitable means such as welding, riveting, bolting, and the like. While sheet metal is the preferred material for the construction of hopper means 17 any desirable material capable of forming the hopper, such as thermoplastics, can be employed.

A plurality of spacer elements (see FIG. 8) are positioned with the narrow opening in the bottom of hopper means 17 and secured to sidewalls 23 and 24 to provide a plurality of outlets in the bottom of hopper means 17. Housing means 19 comprises a plurality of housing means which are then connected to sidewalls 23 and 24 of hopper means 17 in such a manner so as to communicate with the outlets formed in the bottom of hopper means 17 by the plurality of spacer elements. The housing means 19 are secured to the exterior surface of said walls 23 and 24 by any suitable means, such as bolts, which provide easy removal of housing means 19 when desired.

The housing is provided with an outlet (see FIG. 8) positioned beyond the vertical center of the outlet of hopper means 17. Especially desirable results have been obtained wherein the outlet in the housing means are at a 135° angle with respect to the outlets of hopper means 17.

A plurality of furrowing means 18 are laterally aligned along frame 12 and positioned so as to likewise be aligned with the plurality of outlets in the housing means. Furrowing means 18 are connected to frame 12 by any suitable means, such as bolts. Dispensing means, such as a plurality of flexible tubular conduits 21, are connected to the housing means and are positioned so as to communicate with the outlets in the housing means. The other end of conduits 21 are connected to furrowing means 18. The end of conduit 21 which is attached to furrowing means 18 is provided with a 30° angle opening so that when conduit 21 is attached to furrowing means 18 the angle permits proper dispersion of seed and/or fertilizer into the furrow in the soil.

Press wheels 22 are positioned behind each furrowing means and flexible tubular conduits 21 by means of support element 25 which is connected to frame 12 by any suitable means such as by bolts. A chain drive assembly, as shown in part by gearwheel 31, chain 32, and chain guard 33, and which are well known in the art, is connected to a gear drive mechanism (not shown) which in turn is connected to the outer press wheel of the apparatus by any suitable means.

One end of shaft 34 of hydraulic cylinder 16 is connected to linkage member 37 by pin 38. Linkage member 37 is then connected to coupling member 14 by any suitable means (not shown) which allows linkage member to travel in response to movement of shaft 34. The other end of shaft 34 is connected to a second linkage member 41 which is connected to coupling member 42 at one end by any suitable means, such as pin 43, which allows second linkage member 41 to move in a back-and-forth motion response to movement of shaft 34. A third linkage member 44 is pivotally connected to second linkage member 41 at one end and to frame 12 at the other end so that frame 12 and the feed- and fertilizer-metering apparatus can be raised or lowered to the ground by activating hydraulic cylinder 16 by introducing air into hose 46 or 47.

Figure 3:
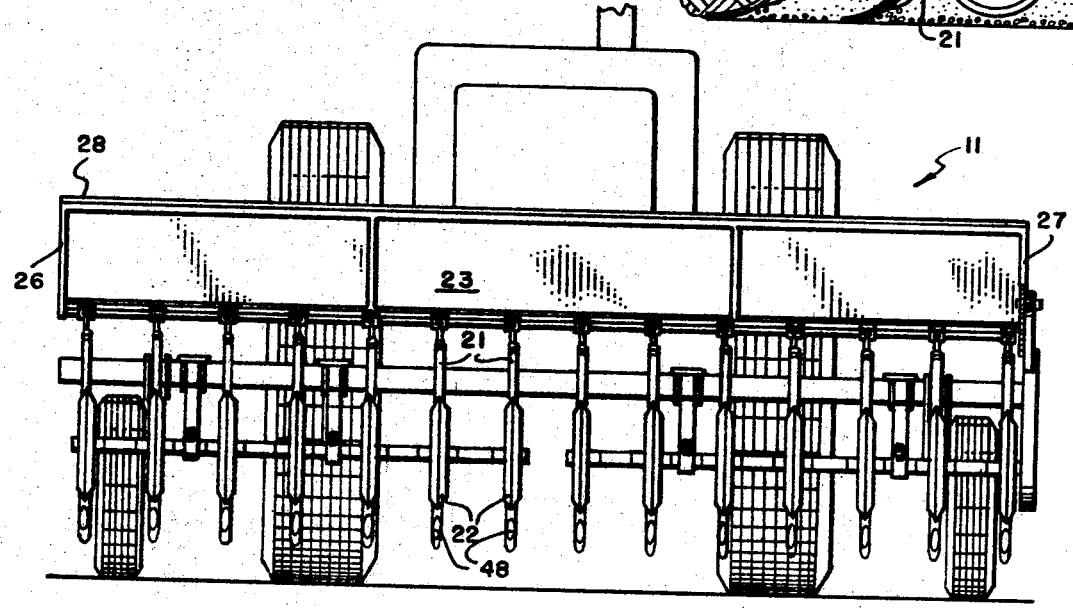
FIG. 3 is a rear view of the apparatus of FIG. 1.

Referring also to FIG. 3, a rear view of the apparatus 11 as shown in FIG. 1 can be seen. The hydraulic cylinder of FIG. 1 has been activated thereby raising apparatus 11 to facilitate its movement from one location to another. Press wheels 22 can clearly be seen positioned behind flexible conduits 21 and the opening created by the 30° angle cut on flexible conduits 21 is readily seen and designated by 48.

Referring now to FIG. 4 a sectional view of hopper means 17 is shown having wall 23, cover plate 28, and spacer elements 49 positioned within a narrow opening within hopper means 17. Spacer elements 49 provide a plurality of outlets for hopper means 17. A plurality of housing means 19 are connected to the exterior of hopper walls 23 and 24 and are in fluid communication with the outlets of hopper means 17. Axle member 51 extends through the plurality of housing means 19 and has positioned thereon a plurality of rotatable means 52 which are likewise positioned within housing means 19. An outlet is provided within each of the housings and tapered conduit 53 is secured to the outlet of housing means 19 by any suitable means such as friction fitting, welding, soldering, etc. Flexible conduits 21, such as plastic tubing, are attached to the lower end of the tapered conduit 53 by clamps 54.

Referring now to FIG. 5 a cutaway portion of the hopper means 17 in conjunction with the rotatable means 52, housing means 19, tapered conduits 53, clamp 54, and flexible conduits 21 is shown. Hopper means 17 is provided with cover plate 28 which is pivotally hinged to one side of hopper means 17 by hinge 56. As can readily be seen housing means 19 is secured to the external portion walls 23 and 24 of hopper means 17 by bolts 57.

Referring now to FIG. 7 in conjunction with FIG. 5 the mechanics of rotatable means 52 and housing means 19 will be discussed. Sides 23 and 24 of hopper means 17 are positioned so as to provide an opening 58 within the bottom portion of hopper means 17. It should be noted that shoulder 59 formed by side 24 and housing means 19 in the lower portion of hopper means 17 has been found necessary in order to prevent bridging of coarse material such as oats, soya beans, shelled corn and the like and thus preventing efficient operation of the dispensing means. Housing means 19 is provided with an outlet 61 at an angle of 135° from the vertical center of an outlet of hopper means 17. Rotatable means 52 positioned within housing means 19 and positioned on axle member 51, is caused to closely fit within housing means 19 thereby preventing seed and fertilizer from escaping and lodging between the housing means 19 and rotatable means 52 thereby impairing efficient operation of the unit.

Referring now in part to FIG. 6 in conjunction with FIGS. 5 and 7 rotatable means 52 is provided with a pair of feeding members 62 and 63, preferably duplicates of each other, which are carried within housing means 19. Feeding members 62 and 63 have smooth peripheral faces and intermatching faces 64 and 66 which are inclined at any suitable angle. Members 62 and 63 are adapted to be adjustably carried on axle member 51 so as to regulate the distance at which the matching faces 64 and 66 are spaced apart to form passage 67 and thereby regulate and govern the amount of seed or fertilizer being discharged from hopper means 17. Feeding members 62 and 63 may be secured to axle member 51 by any suitable means such as a series of set screws or by welding, etc., or the entire assembly can be fabricated from one rod of material by milling the rod into a rotatable means assembly having a plurality of rotatable means. Housing means 19 is provided with an outlet 61 at an angle of approximately 135° from the vertical center of outlets 58 of hopper means 17. Rotatable means 52 is operated in response to the movement of axle member 51 which in turn operates in response to a series of driving means (not shown) and which are well known in the art. Seed or fertilizer 69 positioned within hopper means 17 is schematically shown passing from hopper means 17 through passage 67 formed in rotatable means 52 and thus through outlets 61 of housing means 19 and into tapered conduits 53 into flexible conduit 29.

Figure 8:
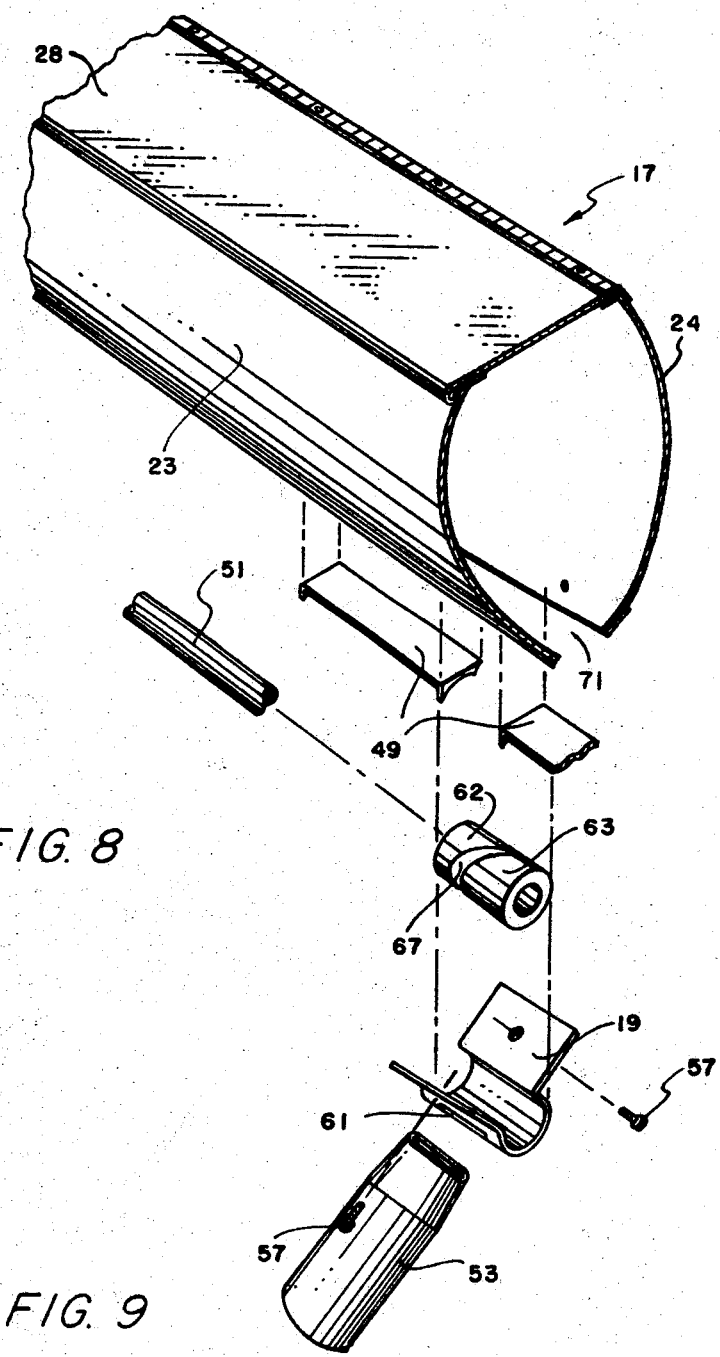
FIG. 8 is a disassembled view of the hopper, the spacer members to form the plurality of outlets within the hopper, the housing means, and the rotatable means of the present invention.
Figure 9:
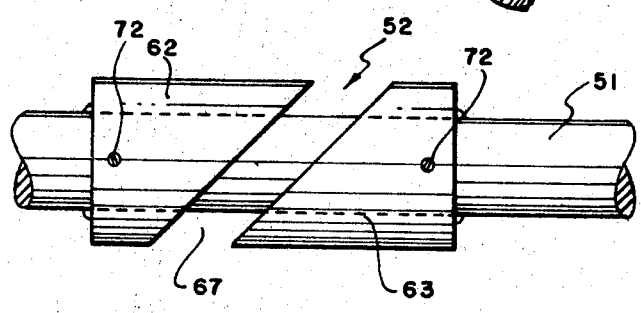
FIG. 9 is a side view of the rotatable means of the present invention.

Referring now to FIGS. 8 and 9 various elements of the previous figures are shown disassembled in order to better understand the various elements. In FIG. 8 hopper means 17 is shown having cover plate 28 and sides 23 and 24 attached thereto and providing a longitudinal opening 71 within the bottom thereof. Spacer elements 49 are shown which are inserted within hopper means 17 and secured thereto by any suitable means such as welding, bolting, and the like. Rotatable means 52 is shown having axle member 51 and feeding members 62 and 63. Feeding members 62 and 63 are positioned so as to form passage 67 therethrough. Housing means 19 is shown having outlet 61 positioned therein and showing bolts 57 for securing housing means 19 to hopper means 17. Tapered conduit 53 is shown having one end tapered thereby forming an elongated opening which communicates with outlet 61 in housing means 19. Tapered conduit 53 can be joined to housing means 19 by any suitable means such as by friction fitting tapered conduit 53 in outlet 61 of housing means 19, or by spot welding, and the like.

FIg. 9 shows a side view of rotatable means 52 of the present invention. As can readily be seen axle member 51 serves as the drive means for rotating the two feed members 62 and 63 of rotatable means 52 so that the feed and/or fertilizer passing through passage 67 is dispersed through the outlet in the housing means and into the flexible conduits. Feed members 62 and 63 are shown connected to axle member 51 by means of set screws 72. Members 62 and 63 can be connected to axle member 51 by any other suitable means, such as welding, or members 62, 63 and axle member 51 can be formed from a rod which has been machined in the desired manner. It is obvious that the oblique orientation of the parallel faces 64 and 66 of the two feed members 62 and 63, fixed upon the shaft or axle member 51, will, as they rotate with the shaft 51, cause a pickup of seed from each respective hopper opening 58. This causes a lateral movement of the seed members relative to the axis of the shaft or axle member 51 in an elliptical or wobble manner transversing the outlet 58 and a seed member is moved around and laterally to the outlet 61 in the housing means 19. From this point, it is obvious that the seed members are dispensed through the conduits 21, shown in FIGS. 5 and 7.

In actual operation the feed or fertilizer is introduced into the hopper. Once the material is introduced the apparatus is transported to the desired location whereupon hydraulic system of the apparatus is activated thereby causing the hopper, the furrowing means, and the press wheels to be lowered. Once the apparatus is lowered and the driving force, such as a tractor, causes the equipment to move forward, the press wheels rotate which in turn are geared to cause the chain to move thereby causing a series of gears to operate which cause the axle of the rotatable means to move. During the movement of the rotatable means material is removed from the hopper through the hopper outlets into the rotatable means and housings and thus into a plurality of dispensing means which are secured to the furrowing means in order to deposit the seed or fertilizer within the furrow. The passage provided within the rotatable means by the two complementing halves can be varied depending upon the rate of feed desired, and, by the design of the rotatable means provide a wobble effect as the seed or fertilizer passes through the passage of the rotatable means and out the housing outlet. Once the movement of the unit ceases the seed or fertilizer by gravity is no longer allowed to flow through the dispensing means because of the slot provided in housing, which is at about a 135° angle with respect to the outlet of the hopper and the rotatable means prevents, by gravity, the flow of the seed or fertilizer. The combination of the 135° angle offset of entrance and exit of the rotatable means assures that the seed moves downwardly, then laterally and somewhat upwardly to the slot in the housing, assuring that the seed will not flow by gravity alone from the hopper means. Likewise, when the unit is raised for transportation to another location the press wheels do not rotate thereby they do not give the driving force to the rotatable means which compels the materials to exit through the outlet of the housing and thus no seed or fertilizer is likewise dispensed during the transportation of the unit in a raised position. Further, it is clearly evident from the above description that the rotatable members can be spaced so as to regulate the flow of material therethrough and thus control the rate of dispensing the material.

The foregoing discussion and description have been made in conjunction with preferred specific embodiments of the seed- and fertilizer-metering device of the invention. However, it is to be understood that the discussion and description is only intended to illustrate and teach those skilled in the art how to practice the invention, and such is not to unduly limit the scope of the invention, which is defined in the claims therefor hereinafter.

We claim:
1. A seed and/or fertilizer feed means comprising:
   a. a frame adapted to have transportation means attached thereto for moving said seed and/or fertilizer means across the ground;
   b. a hopper supported and carried by said frame and having a longitudinal feed slot in its bottom portion;
   c. a housing connected to said hopper extending from and bridging said feed slot, said housing having a peripherally located outlet slot circumferentially offset in position from said feed slot;
   d. rotatable means journally mounted in said housing and including means forming in the periphery of said rotating means a circumferentially continuous slot in a plane oblique to the axis of said rotating means and in communication with said feed slot and said outlet slot and extending laterally of said feed slot; and
   e. means to rotate said rotatable means with respect to said housing whereby in operation material to be fed is picked up by said continuous slot as it passes by said feed slot and is discharged therefrom as it passes said outlet slot in said housing.

2. The feed means, as set forth in claim 1, in which said rotatable means comprises:
   a. an axle;
   b. a first member fixed on said axle; and
   c. a second member fixed on said axle and longitudinally spaced from said first member to form said peripheral continuous slot.

3. The feed means, as set forth in claim 2, in which said members having oblique parallel-facing surfaces, wherein said continuous slot extends obliquely about said axle and an entrance portion thereof when rotated moves longitudinally of said hopper feed slot.

4. The feed means, as set forth in claim 1, including dispensing means depending from said housing in communication with said outlet slot and a press wheel rotatably attached to said frame and adapted to be rotated into ground-engaging position, said press wheel being aligned with said dispensing means, said means to rotate said rotatable means comprising means connected to and being responsive to rotation of said press wheel in said ground-engaging position.

5. The feed means, as set forth in claim 1, in which said housing outlet slot is offset approximately 135° from said feed slot in the direction of rotation of said rotatable means.

6. The feed means, as set forth in claim 1, in which said rotatable means continuous slot traces a continual ellipse during rotation whereby said continuous slot moves longitudinally of said feed slot to provide a wobble-free action.

7. The feed means of claim 1 further comprising:
   a plurality of spacer members positioned within the opening at the bottom of said hopper and connected to said hopper to form a plurality of outlets therein;
   a plurality of housings connected to the bottom of said hopper, each of said housings being in flow communication with an outlet of said hopper and in flow communication with said hopper, said housings each having an outlet positioned at an angle of approximately 135° with respect to a corresponding outlet of said hopper; a rotatable means positioned within each of said housings; comprising each of said rotatable means comprising a rotatable shaft extending lengthwise of its housing and having feeding devices attached thereto, each of said feeding devices comprising two adjustable members having smooth peripheral faces and provided with coacting faces in parallel-spaced relation and arranged obliquely to the axis of said shaft, said rotatable shaft being operated in response to a driving means connected thereto, thereby causing said feeding devices to be rotated; and a plurality of dispensing means connected to said housings and in flow communication with said outlets therein, including a flexible tubular conduit connected at its lower end to a furrow means, a plurality of press wheels connected to said frame and positioned behind said dispensing means to pack the earth moved by said furrowing means, thereby facilitating germination of seed, and a drive gear means connected to at least one of said press wheels and carried thereby, said drive gear means cooperating with said driving means of said rotatable means connected to and carried by said rotatable shaft to cause said rotatable shaft and, thus, said rotatable means to rotate.

UNITED STATES PATENT OFFICE
CERTIFICATE OF CORRECTION

Patent No. 3,554,145     Dated January 12, 1971

Inventor(s) Michael C. Hornung et al.

It is certified that error appears in the above-identified patent and that said Letters Patent are hereby corrected as shown below:

Column 7, lines 1 and 2, cancel "comprising".

Signed and sealed this 1st day of June 1971.

(SEAL)
Attest:

EDWARD M. FLETCHER, JR.         WILLIAM E. SCHUYLER, JR.
Attesting Officer                Commissioner of Patents